United States Patent Office 3,285,128
Patented Nov. 15, 1966

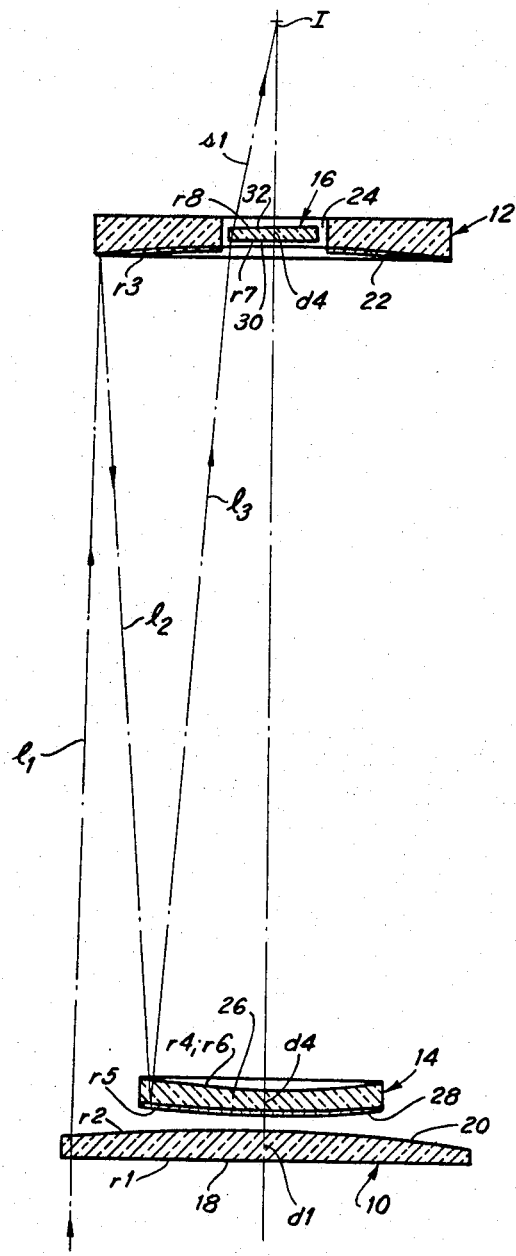

3,285,128
CATADIOPTRIC OBJECTIVE
Franz Schlegel, Munich, Germany, assignor to Optische
Werke G. Rodenstock, Munich, Germany
Filed Nov. 16, 1962, Ser. No. 238,217
Claims priority, application Germany, Dec. 23, 1961,
O 8,448
3 Claims. (Cl. 88—57)

This invention relates to optical systems and more particularly to a specular objective of medium candle power and small angular field as may be employed for visual observations in the field of astronomy.

An object of the invention is to provide a technique for using and of fully retaining the main advantage of a collecting mirror, namely, its complete freedom from chromatic aberrations, in spite of the use of additional refracting elements which are needed for the purpose of introducing correctional measures.

A specular objective according to one feature of the invention is of a structural design wherein the foremost element is constituted by a lens having a positive refractive power throughout. This design has the advantage that a master mirror may be employed which is dimensioned smaller than the lens.

In a specular objective the convergent rays reflected by a master mirror can be deflected by a deflection mirror to their original direction without a real image being formed between the two mirrors. The deflection mirror may be a collecting, scattering or plane mirror. Before the real image is produced, the rays must pass through a central opening in the main or master mirror. In said opening may be provided additional lenses for the correction of image aberrations, particularly of the coma and astigmatic types.

The main mirror and the deflection mirror may be surface mirrors so that they act merely as reflectors. However, they may be also designed as lens mirrors with their respective rear surfaces being mirror-coated.

A specular objective according to the invention is characterized by a front lens isolating the aggregate in relation to the object, a master mirror having a diameter no greater than that of the front lens, a deflection mirror adjacent the front lens, and a correctional system approximately at the location of the master mirror; the length of intersection, that is, the distance to the resulting image, is comparatively small in proportion to the focal length, and never more than 20%.

As the rays in lenses or lens mirrors are refracted to correct the image developed by the master mirror, the glass used in the lenses and lens mirrors was heretofore selected in accordance with this correctional purpose and an attempt was made to eliminate geometric image defects through the proper selection of refractive values. It was therefore necessary to choose a chromatic dispersion of glass materials in such a way that the color of the image being developed by the mirror was not distorted or destroyed.

As is known, however, a secondary spectrum cannot be avoided if an achromatic condition is brought about by glasses having different dispersive powers. Such a secondary spectrum is a disturbing factor in specular objectives of the type with which the invention is concerned, particularly if the focal length is of an appreciable value. The invention eliminates said chromatic aberrations completely in that all refractive parts of the specular objective are made from the same material, and more particularly are of the same type of glass. However, the restriction of all optical elements to an identical refractive value entails certain conditions regarding the refractive power and shape thereof.

A particularly satisfactory elimination of spheric aberration of a master mirror constituted by a surface mirror is obtained if the front lens is constituted by a planoconvex lens with the plane surface facing toward the outside and whose focal length is more than twice the total focal length of the system, when the master mirror is situated approximately the equivalent of one-half of the focal length behind said front lens, when the deflection mirror is a lens mirror with the shape of a dispersing meniscus which, however, due to its mirror-coated convex surface, is a collecting lens having a focal length of at least threefold the focal length of the entire system, and, finally, if the correctional optical member, located by the master mirror, and preferably inside or adjacent a central bore therein, has the shape of a biconvex lens whose focal length approximately equals that of the entire system. The latter's deflection is governed, in the manner known per se by the sine law.

At such a distribution of the refractive power of the lenses, chromatic aberration may be completely eliminated provided that the depth of penetration of marginal rays parallel to the axis is taken into consideration.

Other objects, features and advantages of the invention will be apparent from the following detailed description of a preferred embodiment of the invention as illustrated in the sole figure of the drawing which illustrates, in sectional view, a preferred embodiment of the invention.

As illustrated in the drawing, a specular objective provided in accordance with the invention, comprises four members 10, 12, 14 and 16.

The element 10 is the front lens which is preferably of the plano-convex type. It is characterized by having a positive or collective refractive power throughout. It is circular in shape and has a diameter which is equal to or exceeds the diameters of the remaining elements in the system.

The element 12 is the main or master mirror. It is collective in characteristic and includes a mirrored surface 22. It is provided with a centrally located opening or bore 24. Element 12 is circular in shape and is coaxially aligned with element 10 and is axially spaced therefrom by a distance $l_1$. The diameter of element 12 is no greater than and is preferably less than the diameter of the element 10.

The element 14 is a lens mirror including a lens portion 26 and a mirrored surface 28 on the side thereof remote from the element 12. It is effectively spaced from the element 12 by a distance generally indicated at $l_2$.

Element 16 is a correctional lens of the biconvex type. It is located adjacent the element 12 and preferably within the bore 24. It is provided with convex surfaces 30 and 32.

Light rays pass through element 10 to the mirrored surface of element 12, wherefrom they are reflected towards element 14. With respect to element 14 the light rays pass through the lens section 26 and are reflected by mirrored surface 28 through the bore 24, whereat they are intercepted by element 16 to form an image at point I. The length of intersection to point I is indicated generally at $s_1$. The distances through the various elements considered at the respective axes thereof are denoted generally by references $d_n$, wherein $n=1$ to 4.

The various mirrors and lenses of the above system cooperatively provide a determinable focal length with respect to which the front lens 10 has a focal length at least twice as great as the same, according to the preferred embodiment of the invention. Moreover, the master mirror 12 is preferably spaced from the front lens 10 by a distance which is about one-half of the focal length of the system. Lens mirror 14 has a focal length of at least three times the focal length of the system in accordance with said preferred embodiment. The correctional lens 16 has a focal length approximately equal to the focal length of said system. Preferably all of the elements through which light passes are of the same material and thus have the same refractive index.

The following dimensions based on any measuring system are related to a focal length of 2,000 and an aperture ratio for marginal rays of 1:4, and 1:5.1 for the entire working aperture:

$r_1 = \infty$
$r_2 = -10,000$
$\quad d_1 = 35 \quad 1.567/42.8$
$\quad l_1 = 1020$
$r_3 = -6,570$ mirrored
$\quad l_2 = 980$
$r_4 = -2,900$
$\quad d_2 = 20 \quad 1.567/42.8$
$r_5 = -5,700$ mirrored
$\quad d_3 = d_2 = 20 \quad 1.567/42.8$
$r_6 = -r_4 = +2,900$
$\quad l_3 = 980$
$r_7 = +5,900$
$\quad d_4 = 8.0 \quad 1.567/42.8$
$r_8 = -1,250$
$s' = 309.8$
$f' = 1,891.5$ If the material of the lenses and the deflection mirror is of a substantially lower refractive value than that of currently employed glass then, preferably, the refractive power of the deflection mirror having the shape of a dispersing meniscus should be caused to be negative and likewise the correctional lens should be a meniscus facing the image with its crescent-shaped surface. The following data result for a specular objective, according to the invention, made of a material with a refractive value of 1.4317, a focal length of 2,000 and a geometric aperture ration of 1 to 3.9;

$r_1 = \infty$
$r_2 = -10,810$
$\quad d_1 = 48 \quad n = 1.4317$
$\quad l_1 = 1,000$
$r_3 = -4,845$ mirrored
$\quad l_2 = 932$
$r_4 = -4,597$
$\quad d_2 = 24 \quad n = 1.4317$
$r_5 = -22,565$ mirrored
$\quad d_3 = d_2 = 24 \quad n = 1.4317$
$r_6 = r_4 = -4,597$
$\quad l_3 = 1,004$
$r_7 = -1,238$
$\quad d_4 = 12.0 \quad n = 1.4317$
$r_8 = -557$
$s' = 284.0$
$f' = 2,186.2$ According to a feature of the invention the following dimensional ratios are preferably maintained in relation to the focal length $f_0$ of the total system:

(1) Front lens $2.0 f_0 \leq f_1 \leq 14 f_0$
(2) First air space $0.4 f_0 \leq l_1 \leq 0.6 f_0$
(3) Deflection mirror $-6 f_0 \leq f_3 \leq 6 f_0$
(4) Correctional lens $0.8 f_0 \leq f_4 \leq 1.3 f_0$ It is to be noted that the variations for the refractive powers and the first air space change within the above said range, if the refractive index "$n$" of the system is changed. This is most clearly apparent if the two examples are considered, in which the refractive indexes are 1.567 and 1.4317 respectively, and the limits expressed above are still sufficiently far removed from the values given in the two examples.

Thereby, the arrangement provided enables wide variation for the properties of the elements of the objective for different refractive indexes of the objective.

There will now be obvious to those skilled in the art many modifications and variations of the system set forth above. These modifications and variations will not depart from the scope of the invention if defined by the following claims.

What is claimed is:

1. A specular objective comprising a plano-convex front lens, the plane surface of which faces outwardly, said front lens having a focal length more than twice the focal length of the objective, a master mirror disposed approximately a distance one-half the focal length behind said front lens, a deflection mirror between the front lens and the master mirror in the shape of a dispersing meniscus and having a mirror coated convex surface to constitute a collecting lens having a focal length of at least three times the focal length of the objective, said master mirror having a central bore therein wherethrough light rays are reflected by the deflection mirror, and a biconvex correctional lens in said central bore of the master mirror having a focal length approximately equal to that of the objective, all of said lenses being constituted of the same material, the distance from the correcting lens to the image plane of the objective being no greater than 20% of the focal length thereof.

2. An objective as claimed in claim 1 having the following characteristics:

$r_2 = -10,000$
$\quad d_1 = 35$
$\quad l_1 = 1020$
$r_3 = 6,570$ mirrored
$\quad l_2 = 980$
$r_4 = -2,900$
$\quad d_2 = 20$
$r_5 = -5,700$ mirrored
$\quad d_3 = d_2 = 20$
$r_6 = r_4 = +2,900$
$\quad l_3 = 980$
$r_7 = +5,900$
$\quad d_4 = 8.0$
$r_8 = -1,250$ wherein $r_2$ is the radius of curvature of the convex surface of the front lens, $d_1$ is the axial thickness of the front lens, $r_3$ is the radius of curvature of the mirrored surface of the master mirror, $r_4$ and $r_6$ represent the radius of curvature of the other of the surfaces of the deflection mirror, $r_5$ is the radius of curvature of the mirror surface of the deflection mirror, $d_2$ and $d_3$ each represent the axial thickness of the deflection mirror, $r_7$ is the radius of curvature of the surface of the biconvex lens facing the deflection mirror, $r_8$ is the radius of curvature of the other surface of the biconvex lens, $d_4$ is the axial thickness of the biconvex lens, $l_1$ is the air space between the front lens and the master mirror, $l_2$ is the air space between the master mirror and the deflection mirror and $l_3$ is the air space between the deflection mirror and the biconvex lens; each of the lenses having a refractive index of 1.567 and a dispersive value of 2.8.

3. An objective as claimed in claim 1 having the following characteristics:

$r_2 = -10,810$
$\quad d_1 = 48$
$\quad l_1 = 1,000$
$r_3 = -4,845$ mirrored
$\quad l_2 = 932$
$r_4 = -4,597$
$\quad d_2 = 24$
$r_5 = -22,565$ mirrored
$\quad d_3 = d_2 = 24$
$r_6 = r_4 = -4,597$
$\quad l_3 = 1,004$
$r_7 = -1,238$
$\quad d_4 = 12.0$
$r_8 = -557$ wherein $r_2$ is the radius of curvature of the convex surface of the front lens, $d_1$ is the axial thickness of the front lens, $r_3$ is the radius of curvature of the mirrored surface of the radius of curvature of the other of the surfaces of the deflection mirror, $r_5$ is the radius of curvature of the mirror surface of the deflection mirror, $d_2$ and $d_3$ each represent the axial thickness of the deflection mirror, $r_7$ is the radius of curvature of the surface of the biconvex lens facing the deflection mirror, $r_8$ is the radius of curvature of the other surface of the biconvex lens, $d_4$ is the axial thickness of the biconvex lens, $l_1$ is the air space between the front lens and the master mirror, $l_2$ is the air space between the master mirror and the deflection mirror and $l_3$ is the air space between the deflection mirror and the biconvex lens; each of the lenses having a refractive index of 1.4317.

References Cited by the Examiner

UNITED STATES PATENTS 2,817,270  12/1957  Mandler _____ 88—57

FOREIGN PATENTS 969,797  5/1950  France.

JEWELL H. PEDERSEN, *Primary Examiner.*

JOHN K. CORBIN, DAVID H. RUBIN, *Examiners.*